US011726879B2

(12) United States Patent
Brown et al.

(10) Patent No.: US 11,726,879 B2
(45) Date of Patent: Aug. 15, 2023

(54) MULTIPLE BLOCK ERROR CORRECTION IN AN INFORMATION HANDLING SYSTEM

(71) Applicant: Dell Products L.P., Round Rock, TX (US)

(72) Inventors: Michael E. Brown, Austin, TX (US); Prashanth Giri, Round Rock, TX (US); Senthil Kumar V, Thanjavur (IN); Nagendra Varma Totakura, Round Rock, TX (US); Vasanth Venkataramanappa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 17/372,973

(22) Filed: Jul. 12, 2021

(65) Prior Publication Data

US 2023/0008412 A1 Jan. 12, 2023

(51) Int. Cl.
*G06F 3/06* (2006.01)
*G06F 11/14* (2006.01)
*G06F 11/10* (2006.01)
*G06F 21/57* (2013.01)
*H04L 9/32* (2006.01)

(52) U.S. Cl.
CPC ........ *G06F 11/1417* (2013.01); *G06F 3/0604* (2013.01); *G06F 3/0659* (2013.01); *G06F 3/0673* (2013.01); *G06F 11/1076* (2013.01); *G06F 21/572* (2013.01); *G06F 2221/033* (2013.01); *H04L 9/32* (2013.01)

(58) Field of Classification Search
CPC .. G06F 11/1417; G06F 3/0604; G06F 3/0659; G06F 3/0673; G06F 11/1076; G06F 21/572; G06F 2221/033; H04L 9/32
USPC .......................................................... 714/2
See application file for complete search history.

(56) References Cited

U.S. PATENT DOCUMENTS

| | | | |
|---|---|---|---|
| 8,132,057 B2 * | 3/2012 | Jann .................... | G06F 11/0712 714/38.1 |
| 8,151,147 B2 * | 4/2012 | Rajkumari .......... | G06F 11/0709 714/48 |
| 9,921,915 B2 | 3/2018 | Hung | |
| 2006/0174157 A1 * | 8/2006 | Barrall .................... | G11B 27/11 714/E11.034 |
| 2011/0138219 A1 * | 6/2011 | Walton ................ | G06F 11/0712 714/48 |

(Continued)

*Primary Examiner* — Albert Decady
*Assistant Examiner* — Enam Ahmed
(74) *Attorney, Agent, or Firm* — Larson Newman, LLP

(57) ABSTRACT

An information handling system includes a first memory and a baseboard management controller. The first memory stores a first firmware partition and a second firmware partition. The baseboard management controller includes a second memory. The baseboard management controller begins execution of a DM-Verity daemon, and performs periodic patrol reads of the first firmware partition. The baseboard management controller detects one or more block failures in the first firmware partition, and stores information associated with the one or more block failures in a message box of the second memory. In response to the entire first firmware partition being scanned, the baseboard management controller switches a boot partition from the first firmware partition to the second firmware partition, and initiates a reboot of the information handling system.

15 Claims, 4 Drawing Sheets

(56) References Cited

U.S. PATENT DOCUMENTS

| | | | |
|---|---|---|---|
| 2012/0131375 A1* | 5/2012 | Adda | G06F 9/4843 |
| | | | 719/321 |
| 2018/0276385 A1 | 9/2018 | Heck et al. | |
| 2020/0159633 A1* | 5/2020 | Xia | G06F 11/2033 |

* cited by examiner

MULTIPLE BLOCK ERROR CORRECTION IN AN INFORMATION HANDLING SYSTEM

FIELD OF THE DISCLOSURE

This disclosure generally relates to information handling systems, and more particularly relates to multiple block error correction in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a first memory and a baseboard management controller. The first memory stores a first firmware partition and a second firmware partition.

The baseboard management controller includes a second memory. The baseboard management controller may begin execution of a DM-Verity daemon, and perform periodic patrol reads of the first firmware partition. The baseboard management controller may detect one or more block failures in the first firmware partition, and store information associated with the one or more block failures in a message box of the second memory. In response to the entire first firmware partition being scanned, the baseboard management controller may switch a boot partition from the first firmware partition to the second firmware partition, and initiate a reboot of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
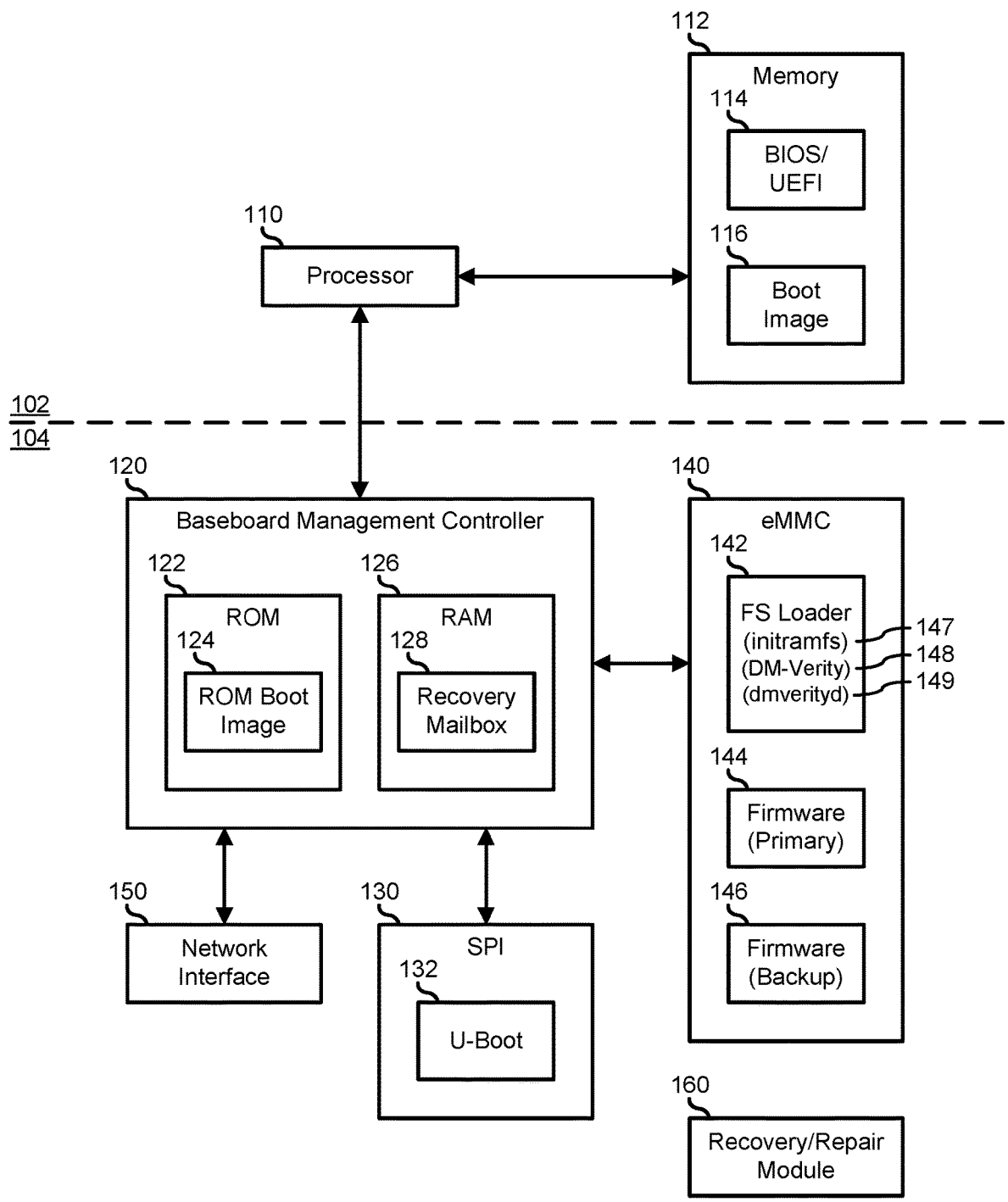
FIG. 1 is a block diagram of an information handling system according to an embodiment of the present disclosure.

FIG. 1 illustrates a portion of an information handling system 100 according to at least one embodiment of this disclosure. Information handling system 100 includes a host processing system 102 and a management system 104. Host processing system 102 represents hardware, firmware, and software components that are typically associated with a computer or other information handing system, and includes a processor 110 and a memory 112. Processor 110 represents one or more central processing units (CPUs), processor cores, or other processing devices, as needed or desired. Memory 112 represents one or more read-only memory (ROM) or random access memory (RAM) data storage devices of information handling system 100, including various volatile and non-volatile data storage devices such as Dual In-Line Memory Modules (DIMMS), Solid-State Drives (SSDs), disk drives, and the like. Processor 110 operates to execute machine-readable code out of memory 112 to perform the processing tasks of information handling system 100, such as to initialize the information handling system, to run an operating system, and to run application programs, as needed or desired. When host processing system 102 is powered on, processor 110 operates to execute basic input/output system/Universal Extensible Firmware Interface (BIOS/UEFI) code 114 from memory 112 to perform a Power On Self Test (POST), to initialize the components of host processing system 102, and execute a boot loader to load an operating system from boot image 116.

Management system 104 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 100. In particular, management system 104 is connected to various components of host processing system 102 via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management system 104 includes network interface device 150 to provide a connection to an external management computer, and the management system can communicate with the management computer to report status information for information handling system 100, to receive BIOS/UEFI or system firmware updates, or to perform other task for managing and controlling the operation of information handling system 100. Management system 104 can operate off of a separate power plane from the components of host processing system 102 so that the management system receives power to manage information handling system 100 when the information handling system is otherwise shut down.

Management system 104 includes a BMC 120, a Serial Peripheral Interface (SPI) device 130, an embedded MultiMedia Card (eMMC) device 140, a network interface device 150, and a firmware recovery and repair module 160. An example of BMC 120 may include a commercially available BMC product or other device that operates in accordance with an Intelligent Platform Management Initiative (IPMI) specification, such as an Integrated Dell Remote Access Controller (iDRAC), an Embedded Controller (EC), or the like. Management system 104 may include additional memory devices, logic devices, security devices, or the like, as needed or desired. BMC 120 includes a ROM 122 and a RAM 126. ROM 122 includes a ROM boot image 124 that includes code that is the first code executed by BMC 120 upon power up of the BMC, as described further below. RAM 126 includes a recovery mailbox 128, as described further below.

SPI device 130 represents a small flash memory device, typically having a 4-8 megabyte (MB) storage capacity that is accessed by BMC 120 via a SPI interface. SPI device 130 includes Universal Boot Loader (U-Boot) code 132 that includes code to load an operating system for BMC 120, as described further below. eMMC device 140 represents a large capacity non-volatile memory device, typically having 32-64 gigabyte (GB) storage capacity that is accessed by BMC 120 via a MultiMedia Card (MMC) interface. eMMC 140 includes a file system loader 142, a primary copy of firmware 144 for management system 104, and a backup copy of firmware 146, as described further below. Note that, primary firmware 144 and backup firmware 146 typically includes an OS, such as for a Linux OS. In an example, such as where information handling system 100 represents a client device like a desktop computer, a laptop computer, a workstation, or the like, backup firmware 146 is a duplicate copy of primary firmware 144. In another embodiment, such as where information handling system 100 represents an enterprise device like a server, a blade system, a network device, or the like, primary firmware 144 represents a current version of the firmware (that is, version "N"), and backup firmware 146 represents a previous version of the firmware (that is, version "N−1"). Recovery and repair module 160 will be described further below. In an example, while file system loader 142 is illustrated in FIG. 1 as being separate from primary firmware 144 and backup firmware 146 in eMMC 140, an iteration of file system loader 142 may be located within primary firmware 144 and another iteration of file system loader 142 may be located within backup firmware 146.

When BMC 120 is powered on, the BMC is configured to begin executing code from ROM boot image 124. ROM boot image 124 operates to read U-Boot code 132 from SPI device 130, to cryptographically verify the contents of the U-Boot code, to load the U-Boot code to RAM 126, and to pass execution off to the U-Boot code. ROM boot image 124 represents the root of trust for all subsequent operations of management system 102. That is, the authenticity and security of all subsequent operations, and the validity of all other firmware elements of management system 104 is predicated on the fact that ROM boot image 124 has not been tampered with or altered in any way. As such, the content of ROM 122, and particularly the code associated with ROM boot image 124 must only be modified by authorized and authenticated agents. The details of authentication of firmware updates in a management system are known in the art and will not be further disclosed herein, except as needed to describe the present embodiments.

When execution is passed to the U-Boot code stored in RAM 126, the U-Boot code operates to read file system loader 142 from eMMC device 140, to cryptographically verify the contents of the file system loader, to load the file system loader to RAM 126, and to pass execution off to the file system loader. File system loader 142 includes a file system initialization program (initramfs) 147, a device mapper and verification program (DM-Verity) 148, and a daemon associated with the DM-Verity program (dmverityd) 149. initramfs 147 mounts a file system associated with eMMC 140, provides a hash tree and Forward Error Correcting (FEC) information for the data stored on the eMMC, and particularly for primary firmware 144 and backup firmware 146, and provides for error correction when a block read results in one or more read errors. DM-Verity 148 verifies the integrity of the blocks that include primary firmware 144 and backup firmware 146 based upon the hash tree.

dmverityd 149 is a daemon that monitors the operations of DM-Verity 148, provides indications to initramfs 147 to perform the necessary error corrections, and writes indications to recovery mailbox 128 when read errors occur, as described further below. In an example, recovery mailbox or messagebox 128 may be any suitable storage location within memory 126 such that large length messages may be stored to communicate a high number of corrupted or failed block numbers. Various code is described herein as being located at various memory devices at different times. It should be understood that management system 104 may include other memory devices, and that such code may be stored and executed from other memory devices than those described here, as needed or desired.

It has been understood by the inventors of the present disclosure that firmware corruption is an increasing problem in embedded systems such as management system 104, especially as memory device capacities have increased. Further, because an embedded system such as management system 104 may operate for long durations of time without rebooting, detection of firmware corruption due to failures in flash memory devices may not be detected in a timely fashion.

In an example, one or more of the elements of management system 104 operate to instantiate firmware recovery and repair module 160. For example, a processor, such as BMC 120 or processor 110, the functions and features of recovery and repair module 160 may be provided as a part of one of ROM boot image 124, U-boot code 132, or file system loader 142, or various combinations of the functions and features of the recovery and repair module may be provided by a one or more of the ROM boot image, the U-boot code, or the file system loader, as needed or desired.

In an example, recovery and repair module 160 operates to receive indications of failed block reads from dmverityd 149. In particular, DM-Verity 148 operates to verify each block read with a hash value for the particular block to ensure the contents of the block. In an example, when DM-Verity 148 detects a failed block read from one or more of SPI device 130 or eMMC device 140, dmverityd 149 determines if the failed block read is associated with a firmware element of management system 104, such as a block associated with file system loader 142, with primary firmware 144, or with backup firmware 146. In an example, the memory being read by DM-Verity 148 may be read-only to provide a secure memory for boot operations of information handling system 100. When a failed block read is associated with a firmware element, dmverityd 149 may create or add information related to the block read failure to recovery a nonvolatile "messagebox", such recovery mailbox 128. In an example, dmverityd 149 is included with, and runs as an integral part of initramfs 147.

In previous information handling systems, a single block read failure may immediately initiate a reboot into a repair mode for the information handling system. This immediate reboot may be disruptive for the information handling system when there are multiple bad memory blocks in the information handling system. As disclosed herein, initramfs 147, DM-Verity 148, and dmverityd 149 may improve information handling system 100, by reducing the number of reboots and correcting all detected bad memory blocks during the same reboot initiated repair mode.

In an example, DM-Verity 148 may scan the entire firmware 144 during the boot operation of information handling system 100. During the scan, DM-Verity 148 may operate to verify each block read with a hash value for the particular block to ensure the contents of the block. If DM-Verity 148 detects a block failure that is an uncorrectable block error or failure, an immediate reboot of information handling system 100 may be initiated. During the reboot, a block of data associated with the uncorrectable block error may be replaced with a corresponding block of data from backup firmware 146.

If DM-Verity 148 detects a block failure that is a correctable block error or failure, dmverityd 149 may create or add information related to the block read failure in a block failure list stored within message box 128. In certain examples, DM-Verity 148 may continue to scan firmware 144 after a block failure is detected. For example, In an example, as the scan of firmware 144 is being performed and information associated with detect block failures are stored in message box 128, DM-Verity 148 may determine whether a threshold number of block failures have been detected.

In response to the number of detected block failures exceeding the threshold, DM-Verity 148 may set a flag within message box 128 to indicate a full partition rescan and a full recovery of firmware 144 is needed. In an example, the flag may further indicate that there are too many block errors to fit the associated information in messagebox 128. If the number of detected block failures does not exceed the threshold, DM-Verity 148 may continue to check all of the blocks, and add information for any block failures to the block failure list in recovery message box 128.

After all blocks of firmware 144 have been scanned, a processor may perform any suitable operations to correct the block failures. For example, the processor may execute DM-Verity 148 to save the full block failure list to message box 128 of memory 126 and initiate a reboot. In an example, U-boot code 132 may switch the firmware partition to be booted from backup firmware 146 instead of primary firmware 144. In this example, the firmware image booted may be redundant firmware partition 146. U-boot code 132 may also unlock firmware 144 so that data may be written to firmware 144.

In response to the reboot, initramfs 147 may read the list of corrupted block numbers via an interface with messagebox 128 and may act on each listed block number. In an example, initramfs 147 may utilize forward error correction (FEC) to correct and repair data in each corrupted block of firmware 144. In another example, initramfs 147 may copy each cryptographically verified good block from current partition in firmware 146 to alternate partition in firmware 144. In this example, initramfs 147 may recover data of all bad blocks and restoring hash integrity in alternate partition. As DM-Verity 148 may read a block of data from backup firmware 146 that is the duplicate copy of the block which experienced the block read error in primary firmware 144. Initramfs 147 may perform a write process to the block in primary firmware 144 which experienced the block read error, thereby repairing the primary firmware image.

In an example, after recovery and repair module 160 writes the blocks from backup firmware 146 to the associated blocks of primary firmware 144, the recovery and repair module may direct management system 104 to reboot to primary firmware 144, which in turn may complete the repair of the primary firmware. In another embodiment, where primary firmware 144 represents the current version of the firmware (that is, version "N"), and backup firmware 146 represents the previous version of the firmware (that is, version "N— 1"), recovery and repair module 160 operates to direct management system 104 to reboot to backup firmware 146, and sends an indication, for example to a management computer connected to network interface 150, that management system 104 is operating on the previous version of the firmware. In an example, a service technician can be directed to perform an update of the firmware to bring management system 100 back to the current "N" version of the firmware.

In an example, recovery and repair module 160 operates to provide forward error correction on the data read from a block that experienced a block read failure. In an example, each block of information includes a data portion and an error-correcting code portion. The data portion comprises the useable data within the block, while the error-correcting code portion includes additional information utilized to correct a limited number of errors within the block, and to detect greater numbers of errors within the block. The mechanisms for forward error correction and for implementing error-correcting code is known in the art and will not be further disclosed herein except as needed to describe the present embodiments.

In particular, the amount of error-correcting code, as a proportion of either the amount of data, or as a proportion of the size of the block may depend upon the particular algorithm utilized for providing the forward error correction function as described In an example, and such details may be determined as needed or desired. In general, forward error correction may be implemented on a per-block basis, such as on data blocks of 512 bytes, on a per-erase-block basis, such as on erase blocks of 128 kilobytes (kB), or on different sized of data, as needed or desired. In an example, based upon the functioning of the forward error correction algorithm utilized, initramfs 148 can distinguish between correctable block read errors, that is, block read errors with a number of errors that is less than a threshold number of errors, and uncorrectable block read errors, that is, block read errors with a number of errors that is greater than the threshold number of errors.

When a block read error is uncorrectable, recovery and repair module 160 operates to recover in accordance with the methods and functions as described above. On the other hand, when a block read is correctable, recovery and repair module 160 operates to provide information to message box 126 indicating that a correctable error occurred, and the block offset for the affected block. Then, when management system 104 is rebooted, instead of booting to backup firmware 146, the management system reboots to primary firmware 144. Then, if a block read error occurs at the same offset, the corrupted block is recovered based upon the forward error correction algorithm, and recovery and repair module 160 writes the repaired block back to the correct offset, and the reboot proceeds. In an example, it will be understood that one or more of SPI device 130 and eMMC device 140 are only unlocked for writing during particular limited stages of the boot process. In an example, recovery and repair module 160 is invoked at a time when the underlying device is unlocked for rewriting.

The operations of the components in management system 104 have been with respect to BMC 120, which may be located within an individual server or other compute device. In an example, the operations described above may be performed by components of a management system located within an enclosure controller of a server chassis without varying from the scope of this disclosure.

Figure 2:
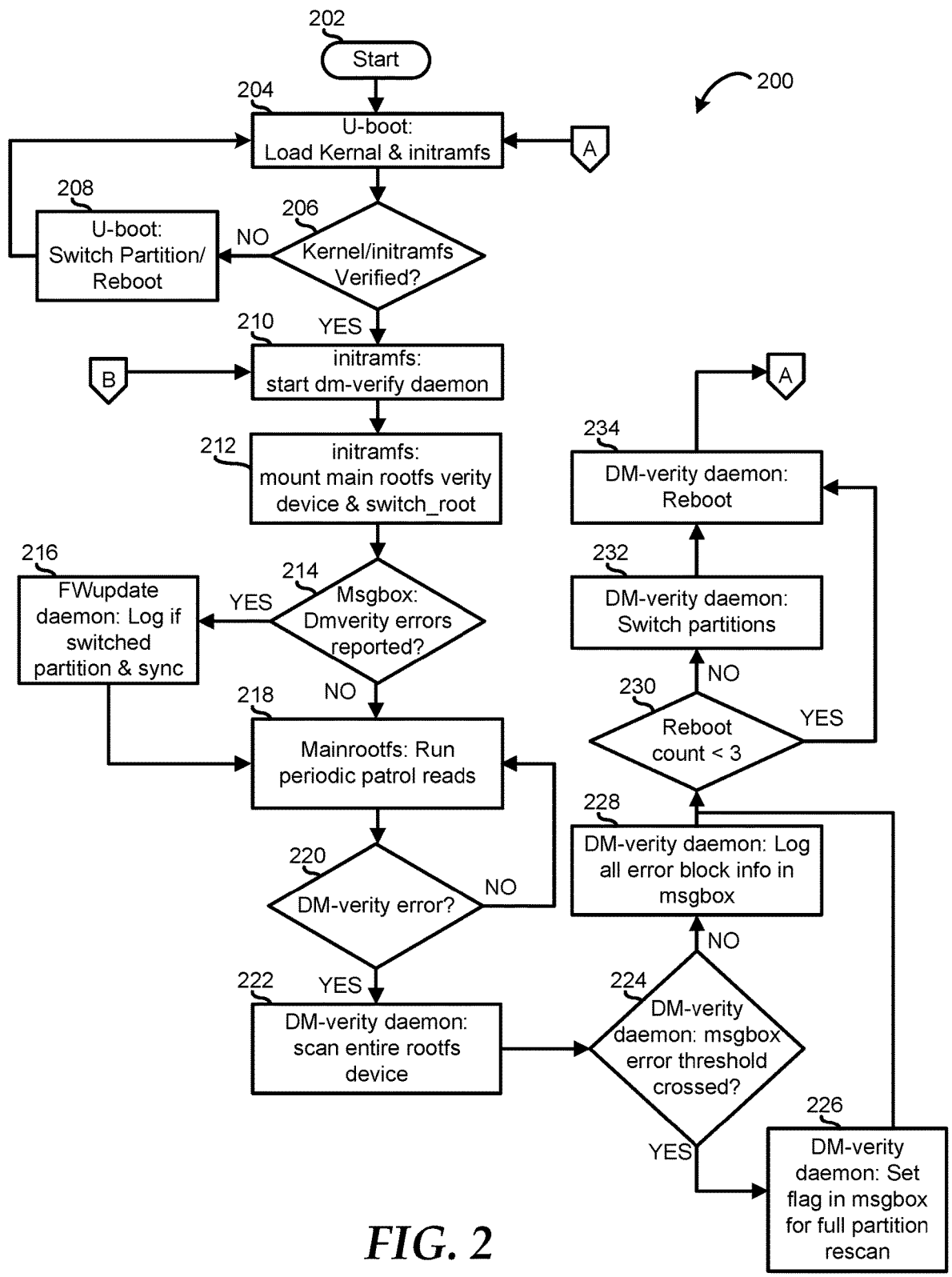
FIG. 2 is a flowchart illustrating a method for detecting multiple block errors in an information handling system according to an embodiment of the present disclosure.

FIG. 2 illustrates a method 200 for detecting multiple block errors in an information handling system according to an embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, by information handling system 100 depicted in FIG. 1, or any other type of system, controller, device, module, processor, or any combination thereof, operable to employ all, or portions of, the method of FIG. 2.

In an example, the flow of FIG. 2 may start based on any suitable detection trigger, such as a CPU reset detection. At block 204, a U-boot loads a kernel and a file system initialization program (initramfs). At block 206, a determination is made as to whether the kernel and initramfs were cryptographically verified. In an example, this decision is made to determine if the kernel and initramfs have been tampered with. If the kernel and initramfs are not verified, the U-boot switches the boot partition and reboots the management system at block 208, and the flow continues as stated above at block 204.

If the kernel and initramfs were cryptographically verified, the initramfs may start a DM-Verity daemon at block 210. In an example, the DM-Verity may be executed by any suitable processor in the information handling system. At block 212, the initramfs mounts a main rootfs verity device and a switch_root device. At block 214, a determination is made whether any DM-Verity errors are reported in a messagebox of a memory in the information handling system. If DM-Verity errors are reported, a firmware update daemon is executed by the processor to log the error if the boot partition has been switched and synchronizes the firmware at block 216, and the flow continues at block 218.

If no DM-Verity errors have been reported, a mainrootfs runs periodic patrol reads of the primary firmware at block 218. In an example, the periodic patrol reads may be reads of a flash device that checks for errors in the firmware. In certain examples, the reads may be performed in the background by a low level kernel. At block 220, a determination is made whether a DM-Verity error has been detected. If not DM-Verity error has been detected, the flow continues as stated above at block 218. If a DM-Verity error is detected, DM-Verity daemon scans the entire rootfs device at block 222. In certain examples, even if block errors have been detected, DM-Verity may utilize forward error correction to scan the entire rootfs. In an example, the rootfs device may include the currently booted firmware, such as a primary firmware or a backup firmware. In certain examples, any detected errors may be logged in the messagebox.

At block 224, a determination is made whether a messagebox error threshold has been exceeded. In an example, this determination may be performed by any suitable device including, but not limited to, DM-Verity daemon in a processor. In certain examples, the error threshold may be any suitable number of errors including, but not limited to, a number of errors may be stored within the messagebox before the amount of storage allocated to the messagebox has been exceeded.

If the error threshold has been exceeded, DM-Verity daemon sets a flag in the messagebox at block 226 and the flow continues at block 230. In an example, the flag may indicate that the threshold number of errors has been exceeded and that a full rescan and recovery of the current partition is needed. If the error threshold has not been exceeded, DM-Verity logs all error block information in the messagebox at block 228. At block 230, a determination is made whether a number of reboots of the partition is greater or less than a threshold. In an example, the threshold number of reboots may be any suitable number including, but not limited to, three reboots, four reboots, and five reboots.

If the number of reboots is less than the threshold, the flow continues at block 234. If the number of reboots is not less than the threshold, DM-Verity switches firmware partitions at block 232. At block 234, DM-Verity reboots a management system of the information handling system, and the flow continues as described above at block 304. In an example, in response to the reboot, the system may be booted in the current firmware partition.

Figure 3:
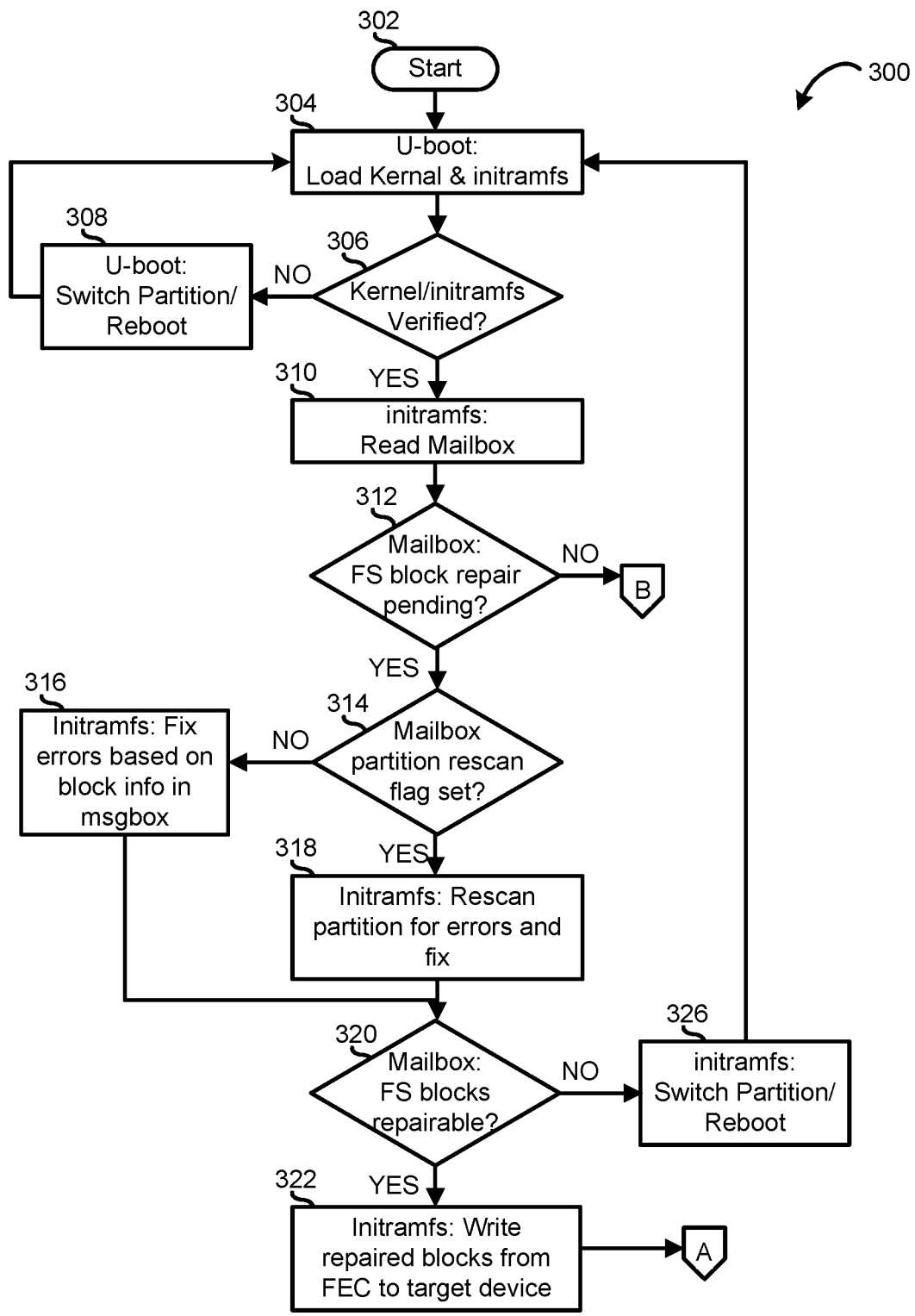
FIG. 3 is a flowchart illustrating a method for repairing multiple block errors in an information handling system according to an embodiment of the present disclosure.

FIG. 3 illustrates a method 300 for repairing multiple block errors in an information handling system according to an embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, or any other type of system, controller, device, module, processor, or any combination thereof, operable to employ all, or portions of, the method of FIG. 3.

In an example, the flow of FIG. 3 may start based on any suitable detection trigger, such as CPU reset detection from the reboot at block 234 of FIG. 2. At block 304, a U-boot loads a kernel and initramfs. At block 306, a determination is made as to whether the kernel and initramfs were cryptographically verified. In an example, this decision is made to determine if the kernel and initramfs have been tampered with. If the kernel and initramfs are not verified, the U-boot switches the boot partition and reboots the management system at block 308, and the flow continues as stated above at block 304.

If the kernel and initramfs were cryptographically verified, the initramfs read a messagebox in a memory of the information handling system at block 310. At block 312, a determination is made whether file system block repair operation is pending. If a file system block repair operation is not pending, the flow transitions to block 210 of FIG. 2 as indicated by block B. In an example, if a file system block repair is not pending, the boot file may stay with a current firmware partition. In another example, if a file system block repair is not pending, the system may switch to a different firmware partition.

If a file system repair operation is pending, a determination is made whether a mailbox or messagebox flag is set at block 314. If the flag is not set, initramfs fixes errors in firmware based on block information stored in the messagebox at block 316, and the flow may continue at block 320. In an example, the correction of errors may be performed in any suitable manner including, but not limited to, copying verified blocks from a backup or redundant firmware to the identified block having the error. If the flag is set, initramfs rescans the entire partition for errors at block 318. In an example, any detected errors are fixed as described above.

At block 320, a determination is made whether file system blocks are repairable. If the file system blocks are repairable, initramfs writes repaired blocks to the target device at block 322, and the flow transitions to block 204 of FIG. 2 as indicated by block A. In an example, the repaired blocks may be generated based on any suitable operation including, but not limited to, a processor performing forward error correction. If the file system blocks are not repairable, initramfs switches firmware partitions and reboots the system at block 326. In response to the system being rebooted the flow may continue as described above at block 304.

Figure 4:
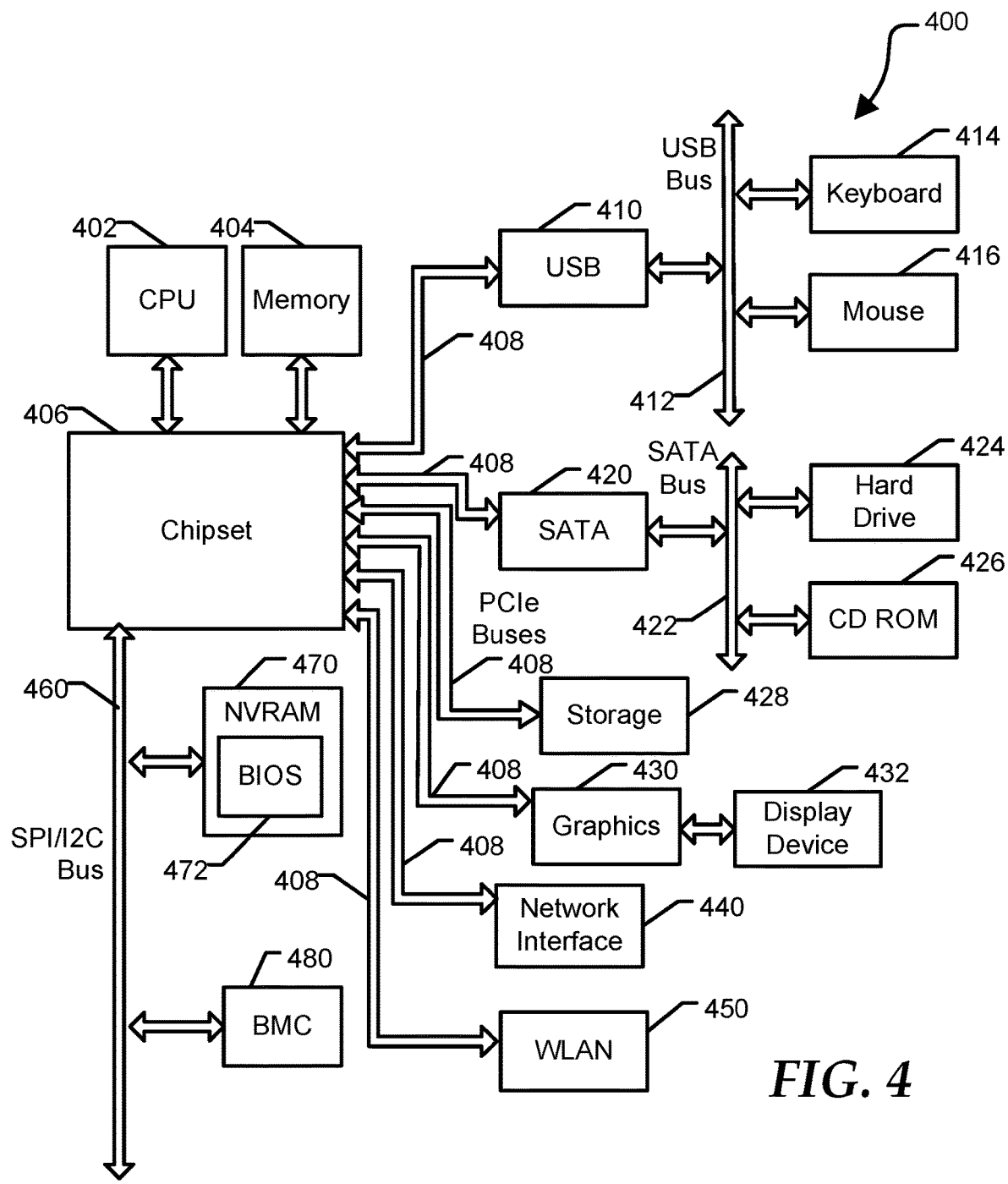
FIG. 4 is a block diagram of a general information handling system according to at least one embodiment of the present disclosure.

FIG. 4 illustrates a general information handling system 400. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 400 including a processor 402, a memory 404, a chipset 406, one or more PCIe buses 408, a universal serial bus (USB) controller 410, a USB bus 412, a keyboard device controller 414, a mouse device controller 416, a configuration a SATA bus controller 420, a SATA bus 422, a hard drive device controller 424, a compact disk read only memory (CD ROM) device controller 426, a storage 428, a graphics device controller 430, a network interface controller (NIC) 440, a wireless local area network (WLAN) or wireless wide area network (WWAN) controller 450, a serial peripheral interface (SPI) bus 460, a NVRAM 470 for storing BIOS 472, and a baseboard management controller (BMC) 480. In an example, chipset 406 may be directly connected to an individual end point via a PCIe root port within the chipset and a point-to-point topology as shown in FIG. 4. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 400 may be any suitable device including, but not limited to, information handling system 100 of FIG. 1. Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an example, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In an example, the instructions may reside completely, or at least partially, within system memory 404 or another memory included at system 400, and/or within the processor 402 during execution by the information handling system 400. The system memory 404 and the processor 402 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first memory to store a first firmware partition and a second firmware partition; and
   a baseboard management controller including a second memory, the baseboard management controller to:
   begin execution of a DM-Verity daemon;
   perform periodic patrol reads of the first firmware partition;
   detect one or more block failures in the first firmware partition;
   store information associated with the one or more block failures in a message box of the second memory;
   in response to the entire first firmware partition being scanned, switch a boot partition from the first firmware partition to the second firmware partition;

initiate a reboot of the information handling system; and upon the reboot:
    if a flag is set in the message box, then perform a full rescan of the first firmware partition; and
    in response to the flag being set:
        read the information in the message box of the second memory; and
        based on the information read from the message box, determine the block failures in the first firmware partition.

2. The information handling system of claim 1, the baseboard management controller further to:
    read data from a block of the second firmware partition, wherein the block is associated with one of block failures in the first firmware partition; and
    write the data from the block of the second firmware partition to the associated block failure of the first firmware partition.

3. The information handling system of claim 2, wherein block of the second firmware partition is a cryptographically verified good block of backup data for the block failure of the first firmware partition.

4. The information handling system of claim 1, wherein in response to data of all block failures of the first firmware partition being replaced by data in corresponding blocks of the second firmware partition, the baseboard management controller further to:
    switch the boot partition from the second firmware partition to the first firmware partition; and
    initiate the reboot of the information handling system.

5. The information handling system of claim 1, wherein the baseboard management controller further to:
    determine whether an error threshold of the message box has been exceeded; and
    in response to the error threshold being exceeded, set a flag in the message box.

6. The information handling system of claim 1, wherein in response to the reboot of the information handling system, the baseboard management controller further to:
    utilize forward error correction to correct all of the block failures of the first firmware partition.

7. A method comprising:
    beginning, by a processor of an information handling system, execution of a DM-Verity daemon;
    performing periodic patrol reads of the first firmware partition;
    detecting, via the DM-Verity daemon one or more block failures in a first firmware partition of the information handling system;
    storing information associated with the block failures in a message box of a memory of the information handling system;
    in response to the entire first firmware partition being scanned, switching a boot partition from the first firmware partition to a second firmware partition;
    determining whether an error threshold of the message box has been exceeded;
    in response to the error threshold being exceeded, setting a flag in the message box;
    initiating a reboot of the information handling system; and
    upon the reboot:
        if a flag is set in the message box, then performing a full rescan of the first firmware partition; and
        in response to the flag being set:
            reading the information in the message box of the second memory; and
            based on the information read from the message box, determining the block failures in the first firmware partition.

8. The method of claim 7, further comprising:
    reading data from a block of the second firmware partition, wherein the block is associated with one of block failures in the first firmware partition; and
    writing the data from the block of the second firmware partition to the associated block failure of the first firmware partition.

9. The method of claim 8, wherein block of the second firmware partition is a cryptographically verified good block of backup data for the block failure of the first firmware partition.

10. The method of claim 7, wherein in response to data of all block failures of the first firmware partition being replaced by data in corresponding blocks of the second firmware partition, the method further comprises:
    switching the boot partition from the second firmware partition to the first firmware partition; and
    initiating the reboot of the information handling system.

11. The method of claim 7, wherein in response to the rebooting of the information handling system, the method further comprises:
    utilizing forward error correction to correct all of the block failures of the first firmware partition.

12. A method comprising:
    beginning, by a processor of an information handling system, execution of a DM-Verity daemon;
    performing periodic patrol reads of the first firmware partition;
    detecting, via the DM-Verity daemon one or more block failures in a first firmware partition of the information handling system;
    storing information associated with the one or more block failures in a message box of a memory of the information handling system;
    in response to the entire first firmware partition being scanned, switching a boot partition from the first firmware partition to a second firmware partition;
    initiating a reboot of the information handling system; and
    upon the reboot:
        if a flag is set in the message box, then performing a full rescan of the first firmware partition; and
        in response to the flag being set:
            reading the information in the message box of the second memory; and
            based on the information read from the message box, determining the block failures in the first firmware partition.

13. The method of claim 12, further comprising:
    reading data from a block of the second firmware partition, wherein the block is associated with one of block failures in the first firmware partition; and
    writing the data from the block of the second firmware partition to the associated block failure of the first firmware partition.

14. The method of claim 13, wherein block of the second firmware partition is a cryptographically verified good block of backup data for the block failure of the first firmware partition.

15. The method of claim 12, wherein in response to the rebooting of the information handling system, the method further comprises:

utilizing forward error correction to correct all of the block failures of the first firmware partition.

* * * * *